United States Patent

[11] 3,626,412

| [72] | Inventor | Trevor Buckley<br>Malvern, England |
|---|---|---|
| [21] | Appl. No. | 834,387 |
| [22] | Filed | June 18, 1969 |
| [45] | Patented | Dec. 7, 1971 |
| [73] | Assignee | Frowds Limited<br>Teddington, England |
| [32] | Priority | Oct. 8, 1968 |
| [33] | | Great Britain |
| [31] | | 47,629/68 |

[54] RADAR SYSTEMS
6 Claims, 1 Drawing Fig.

[52] U.S. Cl. .................................................. 343/7.7,
343/5 PD, 343/7 A, 343/8, 343/14
[51] Int. Cl. ...................................................... G01s 9/42
[50] Field of Search ............................................ 343/7.7, 8,
14

[56] References Cited
UNITED STATES PATENTS

| 2,935,743 | 5/1960 | Glegg ........................... | 343/14 X |
| 3,045,233 | 7/1962 | Katz et al. ..................... | 343/14 |
| 3,149,330 | 9/1964 | Fiocco .......................... | 343/14 |

Primary Examiner—T. H. Tubbesing
Attorney—Holman & Stern

ABSTRACT: A radar system in which a transmitter is frequency or phase modulated at some frequency $f_m$ and acts as the reference for a receiving mixer which is connected both to a selective amplifier centered at a frequency $nf_m$ (where $n$ is an integer) and to a video amplifier, the signal level in the latter being used to control the overall sensitivity of the system to signals received from moving targets, either by varying the gain of the selective amplifier or by varying the response of a later stage of the receiver.

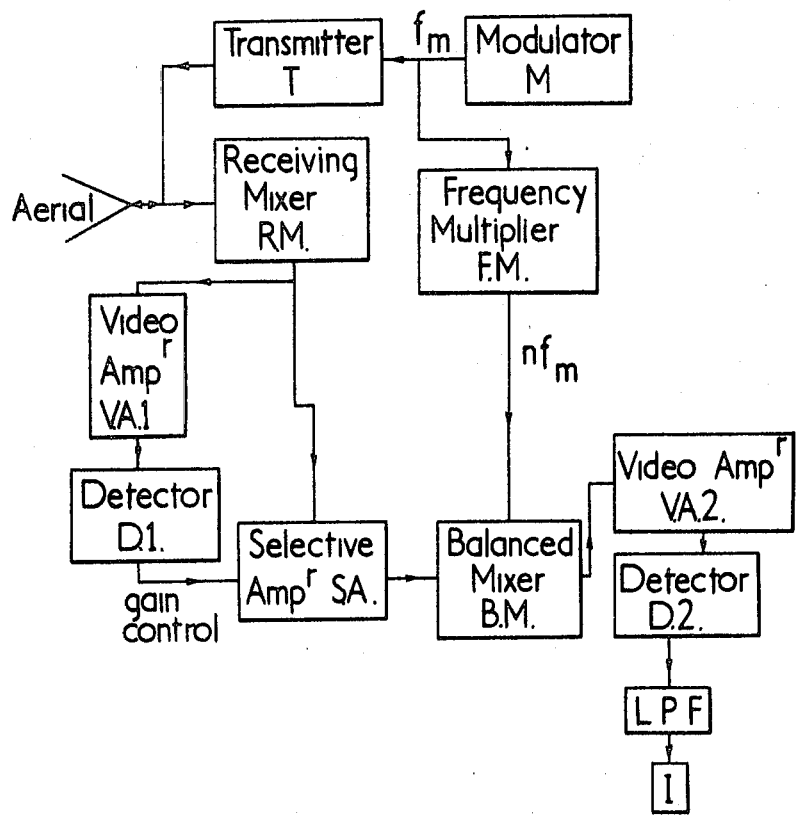

RADAR SYSTEMS

This invention relates to radar systems and is concerned more particularly with doppler radar systems in which a change of frequency, due to the Doppler effect, of a received signal is used to detect relative movement between a target and the system.

Small scale doppler radar systems have been proposed for use as intruder alarm systems, but they suffer from the disadvantage that relatively very small targets such as vermin, birds and even insects can cause false alarms when at very short ranges. This is due to the fact that in a monostatic radar system the power of the echo signal increases very rapidly as the range of the target from the system decreases according to an inverse relationship between the power of the received echo signal and $r^4$, $r$ being the range of the target.

In order to overcome this difficulty, it has been proposed to modulate the frequency of the transmitter at some frequency $f_m$. A sample of the transmitted signal acts as a local oscillator for the receiving mixer whose output, due to the frequency modulation of the transmitter, will contain several harmonics of the modulating frequency $f_m$ each with its associated doppler sidebands due to target motion. Connected to this receiving mixer is a selective amplifier which passes only one of these harmonics $nf_m$ (where $n$ is any integer) along with its associated doppler sidebands. The doppler signal is then extracted by mixing the output of this selective amplifier with a signal at frequency $nf_m$ obtained by frequency multiplication of the transmitter modulation signal. The proportion of the total signal power received which appears in the selected sideband is a function of the transmitter modulation parameters, the order $n$ and the range $r$ to the target. For ranges which are short, relative to the wavelength of the modulation frequency, the proportion of power in the sideband is proportional to $r^{2n}$. This offers a means by which the inverse relationship between the energy received by reflection and $r^4$ can be offset.

That is to say, a frequency-modulated radar system utilizing the energy is only one sideband $nf_m$ of the received signal, has less tendency than an unmodulated doppler radar to overdetect or become exceptionally sensitive at short ranges.

However, the system still has the disadvantage that targets at very short ranges may still be detected, however, owing to second-order effects such as, for example, saturation of the selective amplifier or modulation of the transmitter caused by the very strong signals received from targets at such short ranges. It is an object of the present invention to overcome or reduce effectively this disadvantage.

The present invention consists in a radar system in which a transmitter is frequency or phase modulated at some frequency $f_m$ and acts as the reference for a receiving mixer which is connected to a selective amplifier centered at a frequency $nf_m$ (where $n$ is an integer) and to a video amplifier, the signal level in the latter being used to control the overall sensitivity of the system to signals received from moving targets, either by varying the gain of the selective amplifier or by varying the response of a later stage of the receiver.

In the accompanying drawing is shown one form of radar system according to the present invention.

In carrying the invention into effect according to one convenient mode by way of example, the diagram shows a radar system which includes a transmitter T whose frequency is modulated at some frequency $f_m$ by the modulator M. Some of the transmitter power serves as a reference in the receiving mixer RM.

The receiving mixer RM is connected both to a narrow-band selective amplifier SA, tuned to a frequency $nf_m$, and also to a video amplifier VA1. The signal output of amplifier VA1 is detected and used to control the gain of the amplifier SA. The output of SA is applied to a balanced mixer BM along with a signal at frequency $nf_m$ derived by frequency multiplication of the modulator signal by the frequency multiplier FM. The output of this balanced mixer is fed to one input of a video amplifier VA2 and thence to a detector D2, a low-pass filter LPF and an indicator I.

In the presence of a moving target, an output is displayed by the indicator, which may also be used to trigger an alarm system. A threshold is included either before or after the detector D2 to prevent noise from raising the alarm.

The signal power received by reflection from a target is reduced by a factor of 16 each time that the range to the target is doubled. The effect of the frequency modulation of the transmitter is to make the signal power in the video amplifier VA1 fall even more sharply than this with increasing range. The signal power in the sideband selected by the amplifier SA on the other hand falls rather more slowly than that determined by the $r^4$ law. When the small unwanted target is at short range therefore a strong signal exists in VA1 which after detection reduces the gain of the amplifier SA to the point where no detection is produced at the output of D2. As the range to the target increases the gain of SA is returned to normal and the radar is able to detect the moving target provided that it is sufficiently large to reflect enough transmitted signal back to the receiver at this greater range.

If desired, the signal level of the video amplifier VA1 may be used to control the overall sensitivity of the system by varying the response of a later stage of the receiver instead of the selective amplifier SA.

I claim:

1. A radar system which includes a transmitter, means for frequency or phase modulating the output of the transmitter at a frequency $f_m$, means for feeding a received signal and a sample of the transmitter output to a receiving mixer, means for feeding the output of the receiving mixer to a selective amplifier having a passband centered at a frequency $nf_m$ (where $n$ is an integer) and to a video amplifier arranged to produce an output signal whose power rises, with decreasing range of a target, more sharply than the power in the said passband centered at a frequency $nf_m$, means for extracting a doppler signal from the output of the selective amplifier, and means responsive to the level of said output signal from the video amplifier and operative to reduce the overall sensitivity of the system to signals received from moving targets at short ranges.

2. A system according to claim 1, wherein the output signal from the video amplifier is arranged to control the gain of the selective amplifier.

3. A system according to claim 1, wherein the output signal from the video amplifier is arranged to control the response of a stage of the system following the selective amplifier.

4. A system as claimed in claim 1, which includes a modulator having two outputs of frequency $fm$, one of said outputs being fed to the transmitter for modulating the transmitter at the frequency $fm$ and the other of said outputs being fed to a frequency multiplier to derive a signal of frequency $nf_m$.

5. A system as claimed in claim 4, wherein the outputs of the selective amplifier and the frequency multiplier are fed to a balanced mixer.

6. A system as claimed in claim 5, wherein the output of the balanced mixer is fed to a video amplifier and thence to a detector, low-pass filter and indicator.

* * * * *